US008331074B2

(12) United States Patent
Zhang et al.

(10) Patent No.: US 8,331,074 B2
(45) Date of Patent: Dec. 11, 2012

(54) GRADING DEVICES FOR A HIGH VOLTAGE APPARATUS

(75) Inventors: Chao Zhang, Franklin, WI (US); Jeffrey J. Kester, Bemus Point, NY (US); Charles W. Daley, Olean, NY (US)

(73) Assignee: Cooper Technologies Company, Houston, TX (US)

( * ) Notice: Subject to any disclaimer, the term of this patent is extended or adjusted under 35 U.S.C. 154(b) by 112 days.

(21) Appl. No.: 12/828,808

(22) Filed: Jul. 1, 2010

(65) Prior Publication Data

US 2012/0002339 A1 Jan. 5, 2012

(51) Int. Cl.
*H02H 1/04* (2006.01)

(52) U.S. Cl. .......................................................... 361/117

(58) Field of Classification Search .................. 361/117, 361/127

See application file for complete search history.

(56) References Cited

U.S. PATENT DOCUMENTS

| | | | | | |
|---|---|---|---|---|---|
| 2,427,700 | A | | 9/1947 | Atkinson et al, | |
| 3,004,117 | A | * | 10/1961 | Skooglund | 200/48 R |
| 3,066,180 | A | * | 11/1962 | Virsberg et al. | 174/127 |
| 3,504,268 | A | * | 3/1970 | Scherbaum et al. | 363/141 |
| 3,801,730 | A | | 4/1974 | Nakata et al. | |
| 4,187,389 | A | * | 2/1980 | Foote et al. | 174/73.1 |
| 4,247,504 | A | | 1/1981 | Karppo | |
| 4,355,200 | A | | 10/1982 | Wheeler et al. | |
| 4,456,942 | A | * | 6/1984 | Bronikowski | 361/127 |
| 4,750,077 | A | | 6/1988 | Amagasa | |
| 5,194,408 | A | * | 3/1993 | Stamp et al. | 501/88 |
| 5,210,676 | A | | 5/1993 | Mashikian | |
| 5,218,508 | A | * | 6/1993 | Doone | 361/127 |
| 5,903,427 | A | * | 5/1999 | Roby | 361/128 |
| 5,991,141 | A | | 11/1999 | Mikli et al. | |
| 6,025,560 | A | | 2/2000 | De Buyst et al. | |
| 6,265,669 | B1 | | 7/2001 | Richards | |
| 6,353,236 | B1 | | 3/2002 | Yatsuo et al. | |
| 6,388,197 | B1 | | 5/2002 | Zhao et al. | |
| 6,842,323 | B1 | | 1/2005 | Doone et al. | |
| 6,917,272 | B2 | | 7/2005 | Valdemarsson | |
| 7,450,363 | B2 | | 11/2008 | Hughes | |
| 7,618,550 | B2 | | 11/2009 | Greuter et al. | |
| 2005/0231881 | A1 | * | 10/2005 | Coffeen et al. | 361/118 |
| 2010/0265623 | A1 | * | 10/2010 | Stenstrom et al. | 361/56 |

FOREIGN PATENT DOCUMENTS

WO 2009150100 A1 12/2009

OTHER PUBLICATIONS

International Search Report and Written Opinion for Corresponding Application No. PCT/US2011/039775, Mailed Oct. 4, 2011 (10 pages).

* cited by examiner

*Primary Examiner* — Ronald W Leja
(74) *Attorney, Agent, or Firm* — King & Spalding LLP

(57) ABSTRACT

An electrical assembly having an elongated electrical component, such as a surge arrester, coupled to a grading device for distributing an electric field along the electrical component as a continuous operating voltage is applied to the electrical component. The grading device includes a grading body that is coupled to the electrical component. The grading body includes semi-conductive materials. The semi-conductive materials can be nonmetallic. The grading device has improved flashover resistance over conventional metal grading devices.

23 Claims, 4 Drawing Sheets

GRADING DEVICES FOR A HIGH VOLTAGE APPARATUS

TECHNICAL FIELD

This invention relates to novel grading devices for use with high voltage apparatus. More specifically, the present invention relates to semi-conductive grading devices for high voltage applications having a surge arrester or other device(s) requiring grading.

BACKGROUND OF THE INVENTION

Electrical insulation systems are typically used to isolate components having different electrical potentials in power transmission or distribution equipment, which especially serve to electrically insulate high voltage components from ground, and prevent electric current flow from the high voltage components to ground. Transient overvoltage conditions caused by a system disturbance may lead to power equipment flashover, resulting in a system outage and potential damage to the power equipment.

To reduce or eliminate power equipment flashover, a surge arrester is typically used in parallel with the power equipment. Surge arresters are typically connected to the high voltage terminal to carry electrical surge currents to ground, and thus, prevent damage to the power equipment. Conventional surge arresters typically include an elongated outer housing made of an electrically insulating material, such as porcelain or polymer, a pair of electrical terminals at opposite ends of the housing for connecting the arrester between a high voltage conductor and ground, and an array of electrical components in the housing that form a series path between the terminals. These components typically include a stack of voltage-dependent, nonlinear resistive elements. These nonlinear resistors or varistors are characterized by generally offering high resistance to normal voltage across distribution or transmission lines, and providing very low resistance to surge currents produced by sudden high voltage conditions, such as those caused by a lightning strike, and thereby reducing the risk of power equipment flashover during surge events. Depending on the type of arrester, it may also include one or more electrodes, heat sinks, or spark gap assemblies housed within the insulated housing and electrically in series with the varistors.

The voltage gradient, or voltage distribution, along the surge arrester is generally uneven between the high potential and ground connections. When the electric field at a point in the high voltage apparatus exceeds a critical threshold, significant discharge activity can be initiated, which may result in the degradation of or damage to the materials, eventually leading to apparatus failure. Since the electric field across the surge arrester and power equipment is concentrated at the ends, in an overvoltage condition, the end insulating units will break down first. A substantially uniform voltage gradient along the elongated electrical devices is generally obtained by using grading devices, or within the arrester housing a high number of small capacitors which are connected physically and electrically in parallel to the nonlinear resistive elements. The grading devices are usually in the form of grading rings and are ring-shaped conductors and securing means surrounding the high potential end of elongated electrical devices. By distributing the electric field more evenly, grading devices also minimize discharge activity.

Conventional grading devices are generally constructed from metal, such as aluminum, copper, or galvanized steel. Metal has always been used in grading devices due to its conductive properties, ability to withstand voltage surge currents, corona activities, and ability to withstand exposure to ultraviolet (UV) rays without breaking down in the environment that the grading devices are placed. In the past, manufacturers have not looked to wholly nonmetallic materials, such as plastics or composites, for the construction of the grading devices, because the electrical conductivity of nonmetallic materials is not as good as metallic materials, and the required conductive properties of suitable materials for a grading device are not known. Moreover, the behavior of nonmetallic materials exposed to high voltage surges is also not known.

SUMMARY OF THE INVENTION

The electrical assemblies and grading devices described herein have improved flashover resistance, and thereby an improved Basic Impulse Level (BIL) rating (voltage level of a lightning strike that the equipment can withstand), over conventional assemblies and grading devices. Due to the improvement in BIL rating, the electrical components can be positioned closer together than conventionally possible.

In one aspect, grading devices include at least one grading body and a means for securing the grading body to an electrical component. The grading device distributes an electric field along the electrical component during operation of the electrical component. Of the grading body and the securing means, at least one of these components includes a semi-conductive material. The semi-conductive material may be a polymer having a semi-conductive additive or a filled organic compound. The semi-conductive material of the grading device may have a volume conductivity of at least about $10^{-5}$ siemens per meter, and more preferably of at least about $10^{-3}$ siemens per meter. The semi-conductive material of the grading device may have a permittivity of at least about 10, and more preferably of at least about 1000. The grading device may be constructed from a homogenous nonmetallic semi-conductive material. The grading body and/or the securing means may be constructed from multiple layers, whereby the exterior layer is a nonmetallic semi-conductive material. The grading body and/or the securing means may include metal fillers. Connection joints between the grading body and the securing means, and between the securing means and the electrical component, can include materials that are semi-conductive, conductive, capacitive, inductive, resistive, or combinations thereof. The connection joints may be metal. The grading body of the grading device can be in the form of a ring, a pipe, a tube, or other solid form. The shape of the grading body can include any closed or open circuit shape, including, but not limited to, circular, elliptical, frustoconical, triangular, square, polygonal, or asymmetrical. In certain exemplary embodiments, the grading body is in the form of a ring. The grading device can be asymmetrical, or be frustoconical-shaped. In the case where more than one grading body is present, the grading bodies may have different sizes and/or shapes, or be equal in size and shape. The semi-conductive material can be nonmetallic. The nonmetallic material may be an inductive material, capacitive material, resistive material, or a combination thereof. The grading device may include a coil or a resistor.

In another aspect, electrical assembly systems can include a surge arrester and a grading device of the present invention coupled thereto. The grading device can surround a portion of the surge arrester, or be positioned at a distance away from an end of the surge arrester. The grading device can be coupled to the end of the surge arrester, or to a connector between two units of a surge arrester. The grading device can completely enclose a connector, or be coupled to a connector by a securing means or mounting devices.

In yet another aspect, electrical assembly systems can include a first electrical component and a first nonmetallic grading device of the present invention coupled thereto, and a second electrical component and a second nonmetallic grading device of the present invention coupled thereto. The ratio of the impulse flashover voltage to separation, or strike, distance between the first and second nonmetallic grading devices is greater than the ratio of impulse flashover voltage to separation distance between two grading devices consisting of purely metal components. As used herein, the term "impulse flashover voltage" refers to the crest value of the impulse voltage causing a complete disruptive discharge through the air between electrodes.

DETAILED DESCRIPTION OF THE INVENTION

Figure 1:
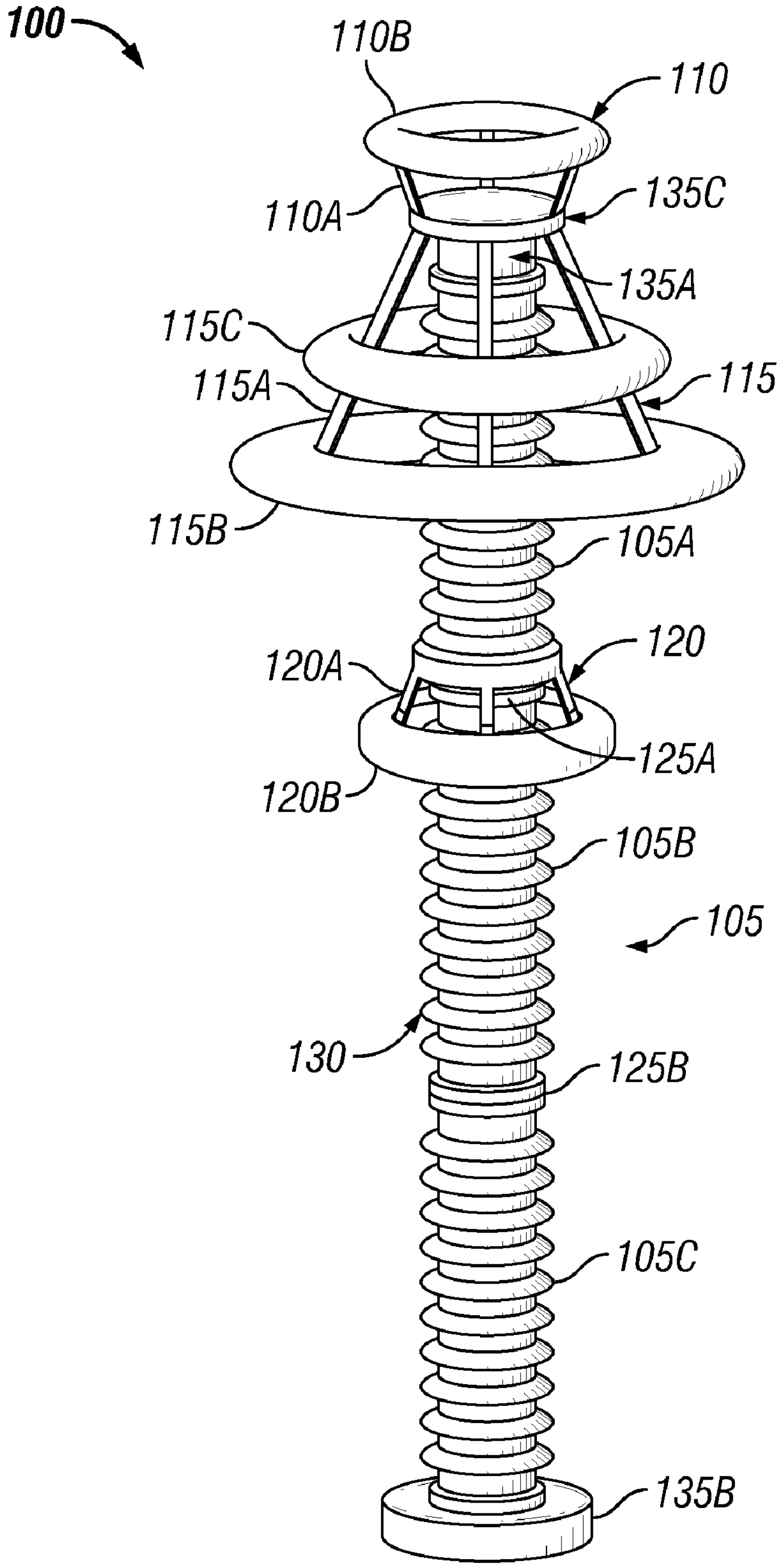
FIG. 1 is a perspective view of an electrical assembly having a surge arrester with grading devices coupled thereto, according to an exemplary embodiment.

A grading device described herein generally includes at least one grading body and at least one means to secure the body to an electrical component or assembly (securing means), wherein at least one of the grading body and the securing means contains substantially no metal components. The grading device is used in conjunction with an electrical component, such as a surge arrester. Generally, the grading devices of the present invention have a similar or comparable grading function as conventional grading devices, as well as a similar minimizing corona functionality. However, the grading devices of the present invention have improved flashover resistance, and thereby an improved Basic Impulse Level (BIL) rating (voltage level of a lightning strike that the equipment can withstand), over conventional grading devices. Due to the improvement in BIL rating over conventional grading devices, the electrical components can be positioned closer together than conventionally possible. The grading devices of the present invention are also able to be used in high voltage operating conditions, and withstand exposure to UV rays without breaking down under expected operation as known in the industry.

The invention may be better understood by reading the following description of non-limitative, exemplary embodiments with reference to the attached drawings wherein like parts of each of the figures are identified by the same reference characters.

FIG. 1 is a perspective view of an electrical assembly 100, according to an exemplary embodiment. The electrical assembly 100 includes a high voltage surge arrester 105 having grading devices 110, 115, 120 coupled thereto. The surge arrester 105 includes a top arrester unit 105*a*, a middle arrester unit 105*b*, and a bottom arrester unit 105*c*. The top arrester unit 105*a* is coupled to the middle arrester unit 105*b* by a connector 125*a*. The middle arrester unit 105*b* is coupled to the bottom arrester unit 105*c* by a connector 125*b*. In certain embodiments, the connectors 125*a*, 125*b* are constructed of metal. In other embodiments, the connectors 125*a*, 125*b* are constructed of a semi-conductive material. The surge arrester 105 includes an elongated outer weathershed enclosure or housing 130 made of an electrically insulating material, such as porcelain or polymer, a line-potential terminal 135*a*, a ground terminal 135*b*, and an array of electrical components (not shown) within the housing 130 that form a series path between the terminals 135*a*, 135*b*. The array of electrical components typically includes a stack of voltage-dependent, nonlinear resistive elements, or varistors. The electrical assemblies of the present invention can include any configuration of suitable surge arresters.

The grading device 110 is coupled to an end of the top arrester unit 105*a* by a connector 135*c*. The grading device 110 is an inverted one-tiered grading system having three mounting rods, or securing means, 110*a* coupled to a grading body 110*b*. In certain exemplary embodiments, the grading body 110*b* is in the form of an annular ring. Although three mounting rods 110*a* are shown, any number of mounting rods 110*a* can be present on the grading device 110. The mounting rods 110*a* are coupled to the connector 135*c* via threaded fasteners or bolts (not shown), such that the grading body 110*b* is positioned at a distance away from the surge arrester 105. A person having ordinary skill in the art can readily determine the optimal distance of the grading body 110*b* with respect to the surge arrester 105, which can vary from case to case based on the voltage and design.

The grading device 110 contains at least one field shaping component. In certain exemplary embodiments, the grading body 110*b* includes a nonmetallic material. In certain other embodiments, the mounting rods 110*a* include a nonmetallic material. In other embodiments, both the grading body 110*b* and the mounting rods 110*a* include a nonmetallic material. As used herein, the term nonmetallic material refers to any material not composed entirely of pure metal. In certain exemplary embodiments, the grading device 110 includes a component constructed from a semi-conductive material, such as a carbon black filled polymer. Suitable materials for use in the grading device 110 include, but are not limited to, materials having a volume conductivity of at least about $10^{-5}$ siemens per meter (S/m) and a permittivity of at least 10. In certain exemplary embodiments, the grading device 110 is constructed of a material having a volume conductivity of at least about $10^{-3}$ S/m and a permittivity of at least 1000. The volume conductivity and the permittivity needed are determined by the desired grading effect for a high voltage apparatus. In certain embodiments, the grading device 110 may include an inductor or a capacitive material. Suitable examples of inductors include, but are not limited to, conductor coils around a material, such as a magnetic core or an air core coil. Suitable examples of capacitive materials include, but are not limited to ceramics such as ZnO, $BaTiO_3$, $Al_2O_3$, and $TiO_2$, polymers such as polyvinylidene fluoride (PVDF), epoxy, and polyester, and composites such as polymer-ceramic composites (for example, polyethylene-ZnO, polyethylene-BaTiO3, epoxy-BaTiO3, and polyester-Al2O3). In certain embodiments, the grading device 110 includes a resistor. In certain embodiments, the grading device 110 is constructed of multi-layered materials, such as a polymer tube or board having an external semi-conductive layer. In certain other embodiments, one of the components of the grading device 110 includes a metal core having an external semi-conductive layer. In certain embodiments, the semi-conductive layer is a carbon black filled polymer, having a volume conductivity of at least about $10^{-5}$ S/m and a permittivity of at least 10. In certain other embodiments, the grading device 110 is manufactured by injection molding or extrusion of homogenous semi-conductive plastic pellets. In certain embodiments, the grading device 110 includes an extruded polyethylene tube having semi-conductive fillers therein. In certain embodiments, the grading device 110 is manufactured from an organic compound with a semi-conductive additive. In certain embodiments, the grading device 110 is manufactured using carbon black dispersed in polymers. Generally, the grading device 110 is suitable for applications in which voltage distribution is desired along the surge arrester 105, as well as corona suppression along the surge arrester 105. The grading device 110 can improve flashover resistance, which can enhance BIL ratings and lead to a reduction in clearance requirement between equipment. In other words, the ratio of the impulse flashover voltage to the separation distance between two nonmetallic grading devices is greater than the ratio of impulse flashover voltage to separation distance between two grading devices consisting of purely metal components. In certain exemplary embodiments, the connector 135*c* is constructed from a conductive, semi-conductive, inductive, or capacitive material. The connector 135*c* can also improve flashover resistance, which can enhance the BIL rating.

The grading device 115 is similar to the grading device 110 (FIG. 1), the difference being in the physical structure of the grading ring. The grading device 115 includes four mounting rods 115*a* coupled to two grading bodies 115*b*, 115*c* that are in the form of annular rings, and is a two-tiered grading system having at least one nonmetallic, semi-conductive component. In certain exemplary embodiments, the grading body 115*b* includes a nonmetallic, semi-conductive material. In certain exemplary embodiments, the grading body 115*c* includes a nonmetallic, semi-conductive material. In certain other embodiments, the mounting rods 115*a* include a nonmetallic, semi-conductive material. In other embodiments, one or both the grading bodies 115*b*, 115*c* and the mounting rods 115*a* include a nonmetallic, semi-conductive material. In certain exemplary embodiments, the grading body 115*b* has a diameter greater than a diameter of the grading body 115*c*. In certain other embodiments, the grading body 115*b* has a diameter equal to a diameter of the grading body 115*c*. The grading body 115*b* is coupled to one end of the mounting rods 115*a*, and the grading body 115*c* is positioned about midway along the length of the mounting rods 115*a*, such that the mounting rods 115*a* coupled with the grading bodies 115*b*, 115*c* form a generally conical shape. The end of the mounting rods 115*a* opposite from the grading body 115*b* is coupled to the connector 135*c* via four threaded fasteners or bolts (not shown), such that the grading bodies 115*b*, 115*c* surround the surge arrester 105. Generally, the highest electrical field concentration occurs at the line potential end of the surge arrester 105. The grading device 115 is the primary means of uniformly distributing the electric field along the surge arrester 105.

The grading device 120 is similar to the grading device 110 (FIG. 1), the difference being in the placement and orientation of the grading body on the surge arrester 105, and the number of mounting rods present on the grading device 110. The grading device 120 includes four mounting rods 120*a* coupled to a grading body 120*b*. In certain exemplary embodiments, the grading body 120*b* is in the form of an annular ring. The end of the mounting rods 120*a* opposite from the grading body 120*b* is coupled to the connector 125*a* between the top arrester unit 105*a* and the middle arrester unit 105*b* via four threaded fasteners or bolts (not shown), such that the grading body 120*b* surrounds the middle arrester unit 105*b* of the surge arrester 105. Generally, the grading device 115 is used to improve the voltage distribution in the lower portion of the top arrester unit 105*a* and the upper portion of the middle arrester unit 105*b*.

Although FIG. 1 illustrates exemplary one- and two-tiered grading devices having at least one nonmetallic component, other grading device configurations can be used. For example, in certain exemplary embodiments, the grading devices utilized can be three-tiered grading rings having three grading bodies spaced along the mounting rods. In certain embodiments, the grading devices can have more than three grading bodies spaced along the mounting rods. The grading devices can be designed any number of ways and placed on any part of the surge arrester to meet the voltage distribution needs of the system. The grading body of the grading device can be in the form of a ring, a pipe, a tube, or other solid form. The shape of the grading body can include any closed or open circuit shape, including, but not limited to, circular, elliptical, frustoconical, triangular, square, polygonal, or asymmetrical. In certain exemplary embodiments, the grading body is in the form of an annular ring. In certain embodiments, grading bodies in the form of annular rings can have equal diameters. The grading body can be made of a homogenous nonmetallic semi-conductive material, or have multiple layers of varying materials but with the exterior layer being a nonmetallic, semi-conductive material. The semi-conductive material can include polymers having a semi-conductive additive.

The securing means can be constructed of nonmetallic or metallic materials. The securing means can include semi-conductive, conductive, capacitive, inductive, and resistive mounting devices, and can be in any form, including, but not limited to, a rod, a tube, a pipe, a coil, a cylinder, and a board. Connection joints between the grading body and the securing means, and between the securing means and the electrical assembly, can include materials that are semi-conductive, conductive, capacitive, inductive, resistive, or combinations thereof.

Figure 2A:
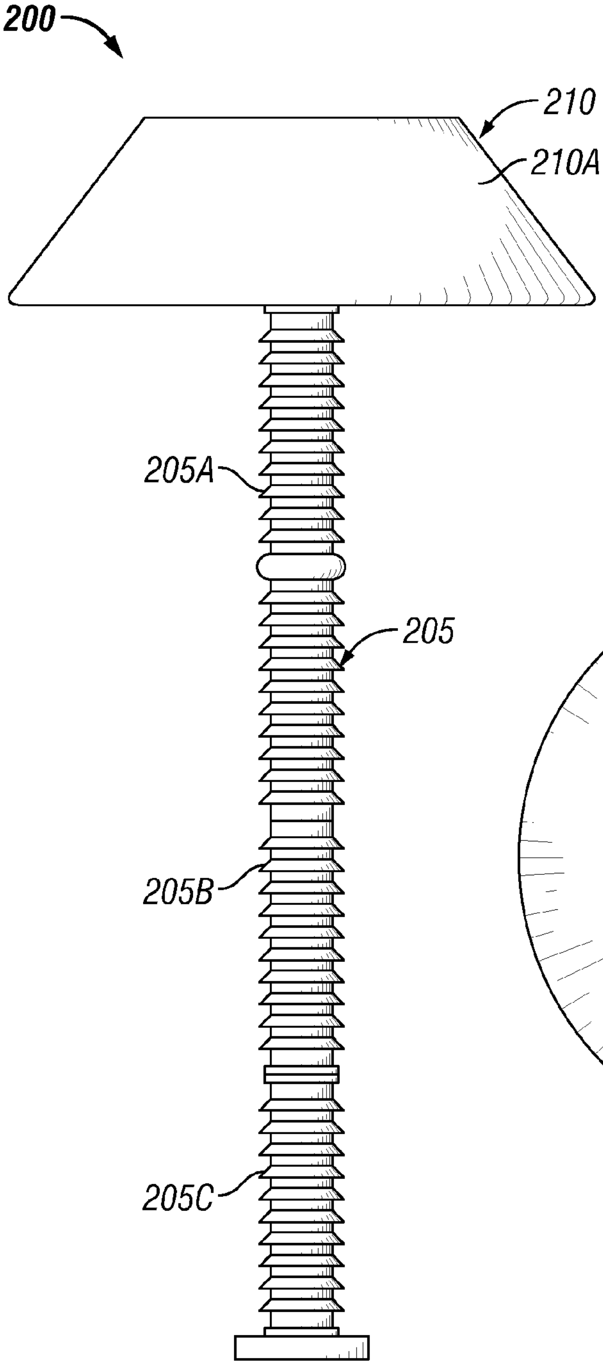
FIG. 2A is a side view of an electrical assembly having a surge arrester with a grading device coupled thereto, according to another exemplary embodiment.
Figure 2B:
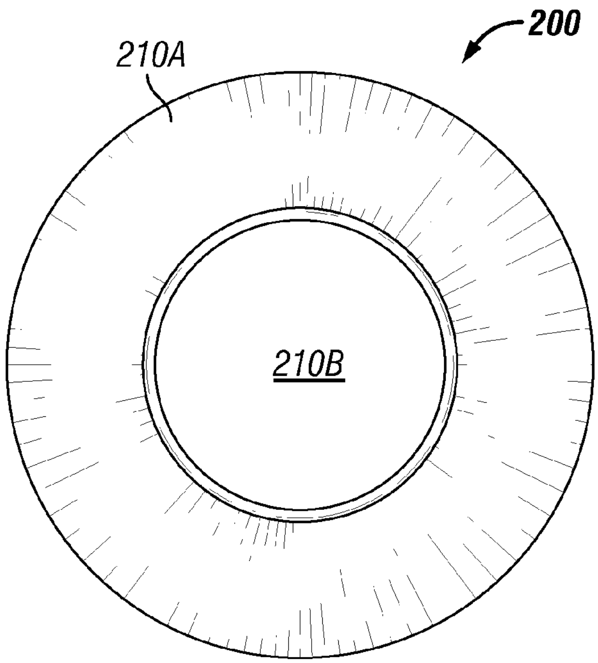
FIG. 2B is a top view of the electrical assembly of FIG. 2A, according to an exemplary embodiment.

Referring now to FIGS. 2A-2B, FIG. 2A is a side view, and FIG. 2B is a top view of an electrical assembly 200, according to another exemplary embodiment. The electrical assembly 200 includes a high voltage surge arrester 205 having a nonmetallic grading device 210 coupled thereto. The surge arrester 200 is similar to the surge arrester 100 (FIG. 1), and includes a top arrester unit 205*a*, a middle arrester unit 205*b*, and a bottom arrester unit 205*c*. The grading device 210 is similar to the grading device 110 (FIG. 1), the difference being in the physical structure of the grading body. The grading device 210 is coupled to an end of the top arrester unit 205*a*. The grading device 210 includes a frustoconical-shaped grading body having a solid side wall 210*a* and a solid planar end 210*b*. The planar end 210*b* is coupled to the end of the top arrester unit 205*a* via a fastening means (not shown) such that the side wall 210*a* surrounds a portion of the surge arrester 205. In certain alternative embodiments, the solid planar end 210*b* is removed such that the grading device 210 includes only the side wall 210*a*, and is coupled to the surge arrester 205 using mounting rods at a point along the surge arrester 205 away from an end. In certain other embodiments, a center portion of the solid planar end 210*b* is removed such that the center portion has a diameter that is larger than a diameter of the surge arrester, and the grading device 210 is coupled to the surge arrester 205 using mounting rods at a point along the surge arrester 205.

Figure 3A:
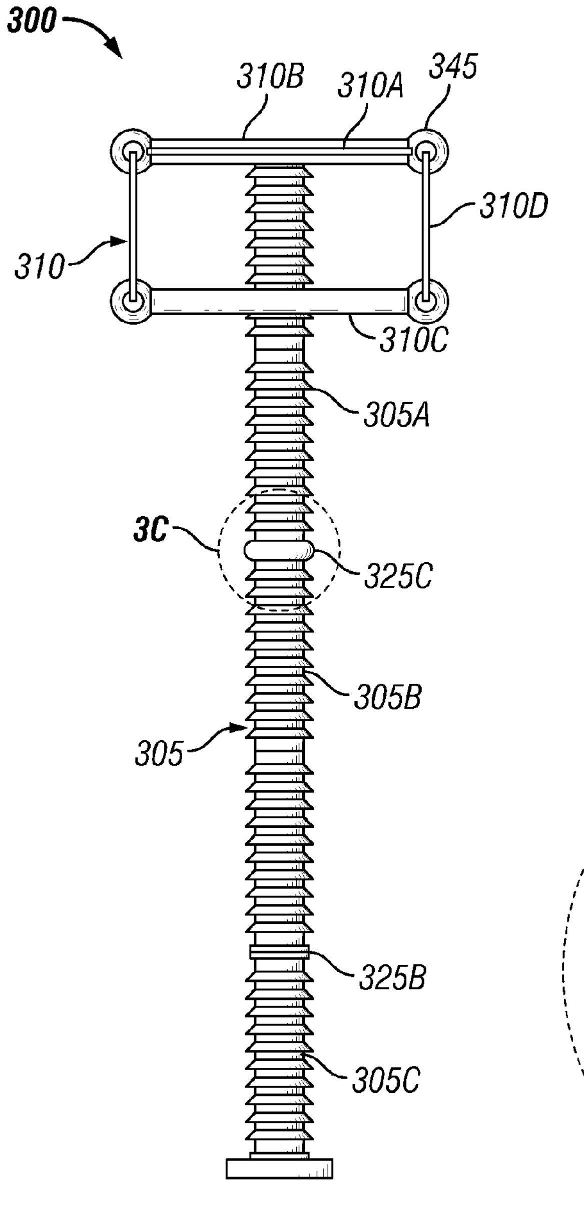
FIG. 3A is a side view of an electrical assembly having a surge arrester with grading devices coupled thereto, according to yet another exemplary embodiment.
Figure 3B:
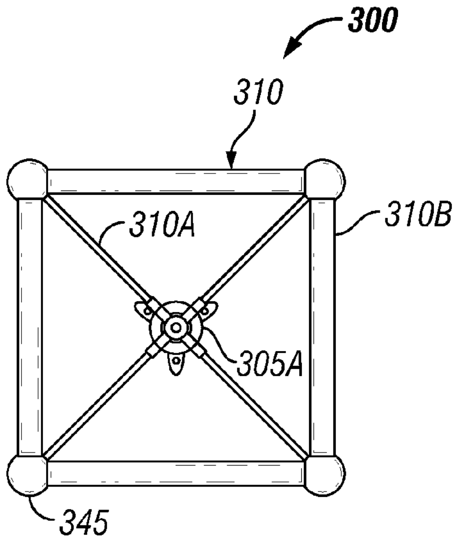
FIG. 3B is a top view of the electrical assembly of FIG. 3A, according to an exemplary embodiment.

Referring now to FIGS. 3A-3B, FIG. 3A is a side view, and FIG. 3B is a top view of an electrical assembly 300, according to another exemplary embodiment. The electrical assembly 300 includes a high voltage surge arrester 305 having a nonmetallic grading device 310 coupled thereto. The surge arrester 300 is similar to the surge arrester 100 (FIG. 1), and includes a top arrester unit 305*a*, a middle arrester unit 305*b*, and a bottom arrester unit 305*c*. The top arrester unit 305*a* is coupled to the middle arrester unit 305*b* by a connector 325*a* (FIG. 3C) and a mid-arrester grading device 325*c*. The middle arrester unit 305*b* is coupled to the bottom arrester unit 305*c* by a connector 325*b* that is similar to the connector 125*b* (FIG. 1).

The grading device 310 is similar to the grading device 110 (FIG. 1), the difference being in the physical structure of the grading body. The grading device 310 is coupled to an end of the top arrester unit 305*a*. The grading device 310 is a two-tiered grading system having four nonmetallic mounting rods 310*a* coupled to a nonmetallic upper square-shaped body 310*b*, and a nonmetallic lower square-shaped body 310*c* coupled to the upper square-shaped body 310*b* by four nonmetallic coupling rods 310*d*. The mounting rods 310*a* are coupled to the end of the top arrester unit 305*a*, such that the lower square-shaped body 310*c* surrounds a portion of the surge arrester 305. In certain exemplary embodiments, the upper and lower square-shaped bodies 310*b*, 310*c* include metallic or nonmetallic conductive connection joints 345 on each corner. Although FIG. 3A illustrates a two-tiered grading system, other grading body configurations can be used. For example, in certain exemplary embodiments, the grading devices utilized can be a three-tiered grading system having three square-shaped bodies spaced along the coupling rods. In certain other embodiments, the grading devices utilized can be a one-tiered grading system having a single square-shaped body. In certain embodiments, each of the square-shaped bodies has a different size. In certain alternative embodiments, each of the bodies may have a shape other than a square, such as a triangle, pentagon, hexagon, or other polygon, or be asymmetric. The grading devices can be designed any number of ways and placed on any part of the surge arrester to meet the voltage distribution needs of the system.

Figure 3C:
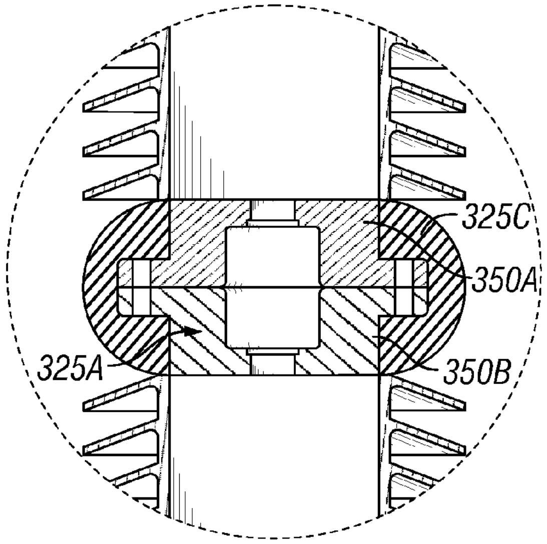
FIG. 3C is a side cross-sectional view of one of the grading devices shown in FIG. 3A, according to an exemplary embodiment.

Referring now to FIG. 3C, FIG. 3C is a side cross-sectional view of the connector 325*a* and the mid-arrester grading device 325*c* shown in FIG. 3A, according to an exemplary embodiment. The connector 325*a* is similar to the connector 125*a* (FIG. 1) and includes two flanges 350*a*, 350*b* that are bolted together to couple the top arrester unit 305*a* to the middle arrester unit 305*b*. In certain exemplary embodiments, the mid-arrester grading device 325*c* is generally toroidal-shaped, and configured to surround the connector 325*a*. In alternative embodiments, the mid-arrester grading device 325*c* can be rectangular-shaped. The exterior surface of the mid-arrester grading device 325*c* can have any shape. The mid-arrester grading device 325*c* can be manufactured similar to the grading device 110 (FIG. 1), and includes a semi-conductive material. In certain exemplary embodiments, the mid-arrester grading device 325*c* is constructed from a semi-conductive rubber. In certain alternative embodiments, the mid-arrester grading device 325*c* may include a semi-conductive plastic, paint or tape.

Figure 4A:
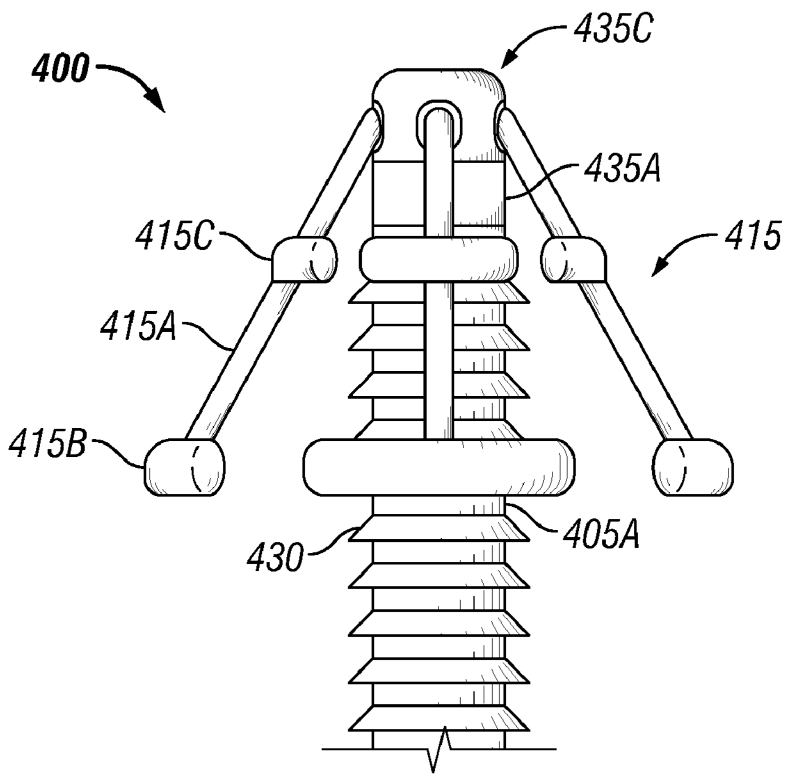
FIG. 4A is a side view of an electrical assembly having a surge arrester with a grading device coupled thereto, according to another exemplary embodiment.
Figure 4B:
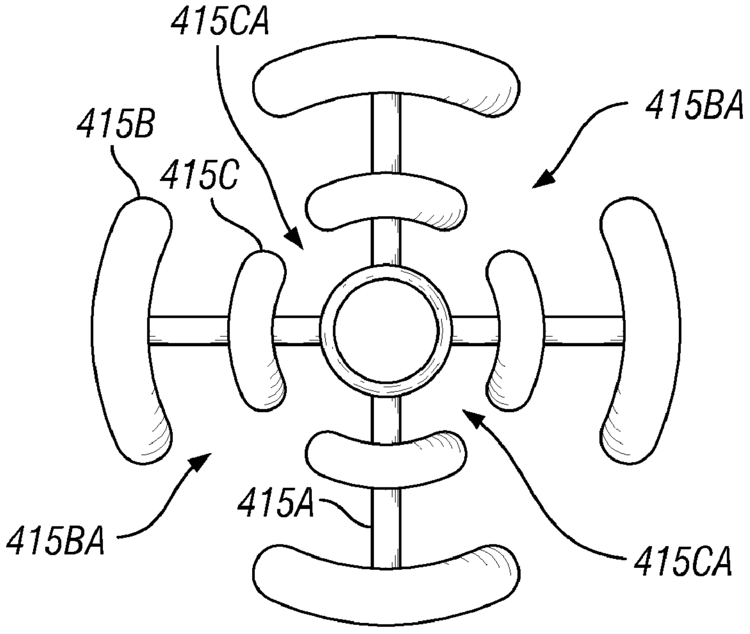
FIG. 4B is a top view of the electrical assembly of FIG. 4A, according to an exemplary embodiment.

Referring now to FIGS. 4A-4B, FIG. 4A is a side view, and FIG. 4B is a top view of a portion of an electrical assembly 400, according to another exemplary embodiment. The electrical assembly 400 includes a top arrester unit 405*a* of a surge arrester 405, a grading device 415, and a connector 435*c*. The surge arrester 405 is similar to the surge arrester 105 (FIG. 1). The grading device 415 is similar to the grading device 115 (FIG. 1), the difference being in the physical structure of the grading body. The grading device 415 is an open shaped, two-tiered grading system having four mounting rods 415*a* coupled to two open shaped grading bodies 415*b*, 415*c*. In certain exemplary embodiments, the grading bodies 415*b*, 415*c* are in the form of rings having four equally spaced openings 415*ba*, 415*ca*, respectively. In certain alternative embodiments, the grading bodies 415*b*, 415*c* can include any number of openings 415*ba*, 415*ca*, and be equally spaced apart, or asymmetrically placed on the grading bodies 415*b*, 415*c*. The grading device 415 includes at least one nonmetallic, semi-conductive component. In certain exemplary embodiments, the grading body 415*b* includes a nonmetallic, semi-conductive material. In certain exemplary embodiments, the grading body 415*c* includes a nonmetallic, semi-conductive material. In certain other embodiments, the mounting rods 415*a* include a nonmetallic, semi-conductive material. In other embodiments, one or both the grading bodies 415*b*, 415*c* and the mounting rods 415*a* include a nonmetallic, semi-conductive material.

The grading devices of the present invention can improve the voltage distribution along the surge arrester, while achieving a grading effect comparable to conventional metal grading devices. The grading devices of the present invention also can provide corona protection comparable to conventional grading devices. The grading devices of the present invention also demonstrate improved flashover resistance and BIL ratings over conventional grading devices. To facilitate a better understanding of the present invention, the following examples of preferred embodiments are given. In no way should the following examples be read to limit or define the scope of the invention.

EXAMPLES

Example 1

A thermal heat run and partial discharge (PD) test were conducted on polymer arresters (rated voltage 240 kV, Maximum Continuous Operating Voltage (MCOV) 190 kV) having (i) no grading, (ii) metal grading bodies, and (iii) semi-conductive grading bodies. The testing was also conducted on porcelain arresters (rated voltage 312 kV, MCOV 245 kV) having (i) metal grading bodies, and (ii) semi-conductive grading bodies. The grading bodies tested were in the form of close shaped annular rings. Fiber-optic temperature sensors were attached to each sample to monitor disk temperature at locations along the arrester. One fiber-optic temperature sensor monitored the ambient room temperature. All of the samples were energized at MCOV until the temperatures stabilized. Partial discharge was also measured at MCOV for the porcelain arrester samples. For temporary overvoltage (TOV), the voltage was increased so as to increase the temperature by 20 degrees C. for the porcelain arrester and 10 degrees C. for the polymer arrester. After the temperature increase was achieved, the voltage was reduced back to MCOV (245 kV for porcelain and 190 kV for polymer). The temperature was monitored until the temperatures stabilized.

Results from the thermal heat run are shown in Table 1 below. Results from the partial discharge test are shown in Table 2 below.

TABLE 1

Thermal heat run results

| Description | Rating (kV) | MCOV (kV) | Ambient Temp (° C.) | Highest Temp (° C.) | Δ in High Temp & Ambient (° C.) |
|---|---|---|---|---|---|
| Polymer/no grading body | 240 | 190 | 20.94 | 39.94 | 19.00 |
| Polymer/metal | 240 | 190 | 18.50 | 26.33 | 7.83 |
| Polymer/semi-conductive | 240 | 190 | 16.57 | 24.79 | 8.22 |
| Porcelain/metal | 312 | 245 | 25.8 | 33.98 | 8.18 |
| Porcelain/semi-conductive | 312 | 245 | 22.49 | 30.75 | 8.26 |

TABLE 2

Partial discharge test results

| Description | Rating (kV) | MCOV (kV) | PD at MCOV (pC) |
|---|---|---|---|
| Porcelain/metal | 312 | 245 | <5 |
| Porcelain/semi-conductive | 312 | 245 | <5 |

All of the samples experienced a rise in temperature due to the power loss. All of the samples having grading bodies demonstrated thermal stability throughout the testing, whereas the arrester without the grading body did not show thermal stability. The PD tests showed that the PD values of the semi-conductive grading body and the metal grading body were comparable.

Example 2

A finite element analysis (FEA) simulation was conducted to show how a nonmetallic semiconductive grading device can improve flashover resistance, and thereby improve BIL ratings over conventional metallic grading devices. The FEA was conducted using the software Maxwell V12 commercially available from Ansoft. A three-unit surge arrester having a grading device having two annular ring-shaped grading bodies with four mounting rods as support means (similar to the grading device 115 shown in FIG. 1) was tested. The surge arrester has a rating of 330 kV. When a surge is applied to the top of the arrester, a voltage exists between the bottom grading body and the connector between top arrester unit and middle arrester unit. This voltage is defined as $V_{AB}$. In the FEA simulation, the grading device was assumed to be constructed of a homogenous material. Simulations were conducted on four grading devices as follows: (i) metal grading device, (ii) semiconductive grading device having conductivity of 0.1 S/m, (iii) semiconductive grading device having conductivity of 0.01 S/m, and (iv) semiconductive grading device having conductivity of 0.001 S/m.

Table 3 below summarizes the peak $V_{AB}$ values when a standard 1.2/50 μs impulse wave with a peak of 1500 kV is applied to the top of the arrester having a grading device coupled thereto. The results indicate that the $V_{AB}$ has the highest value when the grading device is constructed from only metallic materials. The $V_{AB}$ is shown to decrease with decreasing volume conductivity of the grading device. For example, the $V_{AB}$ decreased to 239 kV when the volume conductivity of the grading device is 0.01 S/m, which was 66% of the $V_{AB}$ value for the metal grading device (363 kV). In other words, the BIL level can be increased by about 52% by replacing a metal grading device with a nonmetallic semiconductive grading device having a volume conductivity of 0.01 S/m.

Table 3 also lists the peak $V_B$ values, which can show the grading effect with respect to the varying grading devices. The $V_B$ value is the voltage between the connector (top unit and middle unit) and the ground. For a three equal unit arrester under impulse surge having a peak value of 1500 kV, the ideal peak $V_B$ value would be 1000 kV. The results suggest that the nonmetallic grading devices can improve the grading effect during the impulse surge wave. The peak voltage at the connector ($V_B$) for the nonmetallic grading device having a volume conductivity of 0.01 S/m is about 1016 kV, while the peak voltage at the connector for the metal grading device is about 1137 kV.

TABLE 3

Finite element analysis simulation results

| Description | Conductivity (S/m) | $V_{AB}$ (kV) | $V_B$ (kV) |
|---|---|---|---|
| Metal grading device | $3.8 \times 10^7$ | 363 | 1137 |
| Semiconductive device | 0.1 | 312 | 1085 |
| Semiconductive device | 0.01 | 239 | 1016 |
| Semiconductive device | 0.001 | 232 | 999 |

Therefore, the results from the simulation suggest that the present invention of using a nonmetallic semiconductive grading device in high voltage apparatus can improve flashover resistance to impulse surge, which can lead to an increased BIL rating, as well as improve the grading effect, during the impulse surge wave.

Therefore, the present invention is well adapted to attain the ends and advantages mentioned as well as those that are inherent therein. The particular embodiments disclosed above are illustrative only, as the present invention may be modified and practiced in different but equivalent manners apparent to those having ordinary skill in the art having the benefit of the teachings herein. Having described some exemplary embodiments of the present invention, it is believed that the use of alternate grading device configurations is within the purview of those having ordinary skill in the art. Also, nonmetal grading bodies including semi-conductive materials may be used in a capacitor bank for corona protection. These corona protection rings can be manufactured similarly to the grading bodies of the present invention, but have different structural configurations to accommodate the configuration of the capacitor bank. In addition, the grading device configurations may be used in other high voltage applications where an external grading or corona protection device is needed, such as with potential voltage transformers and current transformers. While numerous changes may be made by those having ordinary skill in the art, such changes are encompassed within the spirit of this invention as defined by the appended claims. It is therefore evident that the particular illustrative embodiments disclosed above may be altered or modified and all such variations are considered within the scope and spirit of the present invention.

What is claimed is:

1. A grading device for distributing an electric field, in a high voltage transmission system, the device comprising:

a surge arrester comprising an elongated outer body, a first end electrically coupled to a high voltage conductor, and a second end electrically coupled to ground;

at least one grading body; and a means for securing the grading body to the first end of the surge arrester, wherein the at least one grading body comprises a semi-conductive material, wherein, as a continuous high operating voltage is applied through the conductor to the surge arrester, the at least one grading body distributes said electric field over the surge arrester to achieve a grading effect along the surge arrester, and wherein the at least one grading body further provides corona suppression for the surge arrester.

2. The grading device of claim 1, wherein the semi-conductive material is a filled polymer or a filled organic compound.

3. The grading device of claim 1, wherein the semi-conductive material has a volume conductivity of at least about $10^{-5}$ siemens per meter.

4. The grading device of claim 1, wherein the at least one grading body comprises a homogenous semi-conductive material.

5. The grading device of claim 1, wherein at least one of the grading body or the securing means comprises an exterior layer and at least one interior layer, wherein the exterior layer comprises a semi-conductive material.

6. The grading device of claim 1, wherein the at least one grading body comprises carbon black.

7. The grading device of claim 1, wherein the at least one of the grading body or securing means comprises metal fillers.

8. The grading device of claim 1, further comprising semi-conductive connection joints between the at least one grading body and the securing means.

9. The grading device of claim 1, wherein the at least one grading body has a shape selected from the group consisting of closed or open circles, ellipses, triangles, squares, and other polygons.

10. The grading device of claim 1, wherein the at least one grading body has a frustoconical shape.

11. The grading device of claim 1, wherein the at least one grading body comprises two or more grading bodies, wherein each of the two or more grading bodies are sized differently.

12. The grading device of claim 1, wherein the semi-conductive material is a nonmetallic material selected from at least one of a group consisting of inductors capacitive materials, and resistors.

13. The grading device of claim 1, wherein the at least one grading body increases a basic impulse level rating of the surge arrester relative to the surge arrester coupled to the at least one grading body comprising purely conductive material.

14. An electrical assembly in a high voltage transmission system, comprising:

a surge arrester comprising a first end electrically coupled to a high voltage conductor and a second end electrically coupled to ground; and a grading device coupled to the first end of the surge arrester, wherein the grading device comprises at least one grading body and a means for securing the grading body to the surge arrester, wherein the at least one grading body comprises a semi-conductive material, and wherein, as a continuous high operating voltage is applied through the conductor to the surge arrestor, the grading device distributes an electric field to achieve a grading effect along at least a portion of the surge arrester and provides corona suppression for the surge arrester.

15. The electrical assembly of claim 14, wherein the grading body surrounds a portion of the surge arrester.

16. The electrical assembly of claim 14, wherein the surge arrester includes at least two arrester units coupled together by a connector, wherein the grading device surrounds the connector.

17. The electrical assembly of claim 14, wherein the grading body has a shape selected from the group consisting of closed or open circles, ellipses, triangles, squares, and other polygons.

18. The electrical assembly of claim 14, wherein the semi-conductive material is a nonmetallic material selected from at least one of a group consisting of inductive materials, capacitive materials, and resistive materials.

19. The electrical assembly of claim 14, wherein the grading device increases a basic impulse level rating of the surge arrester relative to the surge arrester coupled to the grading device comprising purely conductive material.

20. An electrical assembly system in a high voltage transmission system, comprising:

a first surge arrester comprising an elongated first outer body, a first end electrically coupled to a first high voltage conductor, and a second end electrically coupled to ground;

a second surge arrester comprising an elongated second outer body, a third end electrically coupled to a second high voltage conductor, and a fourth end electrically coupled to the ground;

a first grading device coupled to the first surge arrester, the first grading device comprising a first grading body and a first means for securing the first grading body to the first end of the first surge arrester, wherein the first grading body comprises a nonmetallic material; and a second grading device coupled to the second surge arrester, the second grading device comprising a second grading body and a second means for securing the second grading body to the third end of the second surge arrester, wherein the second grading body comprises the nonmetallic material, wherein a ratio of impulse flashover voltage to separation distance between the first and second grading devices is greater than a ratio of impulse flashover voltage to separation distance between two grading devices consisting of purely metal components.

21. The electrical assembly system of claim 20, wherein the nonmetallic material has a volume conductivity of at least about $10^{-5}$ siemens per meter.

22. The electrical assembly system of claim 20, wherein the nonmetallic material has a permittivity of at least about 10.

23. The electrical assembly system of claim 20, wherein the first grading device increases a first basic impulse level rating of the first surge arrester relative to the first surge arrester coupled to the first grading device comprising purely conductive material, and wherein the second grading device increases a second basic impulse level rating of the second surge arrester relative to the second surge arrester coupled to the second grading device comprising the purely conductive material.

* * * * *